United States Patent [19]

Kinghorn

[11] Patent Number: 4,481,579
[45] Date of Patent: Nov. 6, 1984

[54] DIGITAL DATA APPARATUS HAVING A PLURALITY OF SELECTIVELY ADDRESSABLE PERIPHERAL UNITS

[75] Inventor: John R. Kinghorn, Sutton, England

[73] Assignee: U.S. Philips Corporation, New York, N.Y.

[21] Appl. No.: 397,389

[22] Filed: Jul. 12, 1982

[30] Foreign Application Priority Data

Jul. 31, 1981 [GB] United Kingdom ............... 8123483

[51] Int. Cl.³ .................................................. G06F 13/00
[52] U.S. Cl. ................................................... 364/200
[58] Field of Search ... 364/200 MS File, 900 MS File

[56] References Cited

U.S. PATENT DOCUMENTS

| | | |
|---|---|---|
| 4,041,472 | 8/1977 | Shah et al. ......................... 364/900 |
| 4,135,240 | 1/1979 | Ritchie .............................. 364/200 |
| 4,158,227 | 6/1979 | Baxter et al. ....................... 364/200 |
| 4,164,786 | 8/1979 | Gollomp ............................ 364/200 |
| 4,195,351 | 3/1980 | Barner et al. ...................... 364/900 |
| 4,200,930 | 4/1980 | Rawlings et al. ................... 364/200 |
| 4,263,650 | 4/1981 | Bennett et al. ..................... 364/200 |
| 4,326,250 | 4/1982 | McCullough ...................... 364/200 |
| 4,335,426 | 1/1982 | Maxwell et al. .................... 364/200 |

OTHER PUBLICATIONS

E. J. Annunziata et al., "Basic Storage Module Selection Check", *IBM Technical Disclosure Bulletin*, vol. 18, No. 3, Aug. 1975, pp. 878-879.

*Primary Examiner*—Joseph F. Ruggiero
*Assistant Examiner*—Gary V. Harkcom
*Attorney, Agent, or Firm*—Jack E. Haken; James J. Cannon, Jr.

[57] ABSTRACT

Digital data apparatus comprising a processing unit which can have access to different numbers of memory units over a common data bus. The processing unit can address the memory units with select signals over individual leads of an address bus. Address codes containing select signals are valid only when they select only a single memory unit. The validity of an address code is determined in the processing unit by comparing it with a corresponding identification code read over the data bus from a memory unit addressed by the code. Because an address code containing more than one select signal may select more than one memory unit, each address code has associated with it a number of flag bits which signify how many select signals the address code contains, and the corresponding identification code includes these flag bits. When an address code selects more than one memory unit there will be conflict on the data bus between the address code portions of the read identification codes. However, the flag bit portions of these read identification codes are not in conflict and can be compared with the flag bits associated with the address code being used to determine whether or not this address code is valid.

5 Claims, 4 Drawing Figures

DIGITAL DATA APPARATUS HAVING A PLURALITY OF SELECTIVELY ADDRESSABLE PERIPHERAL UNITS

BACKGROUND OF THE INVENTION

1. Field of the Invention

The invention relates to a digital data apparatus comprising a data processing unit and a plurality of peripheral units, said data processing unit and said peripheral units being connected to a data bus for the transfer of digital data, said data processing unit being also connected to an address bus which comprises at least as many address lines as there are peripheral units, each peripheral unit is directly connected to said data processing unit by means of at least one of said address lines for selectively addressing said peripheral unit, each peripheral unit includes a dedicated storage location for storing a multi-bit identification code which identifies uniquely that peripheral unit. Commonly, a processing unit is implemented as an integrated circuit in a package, with connection to one or more peripheral units (for example, RAM's) external to the integrated circuit package being effected by way of external connecting pins on the package.

2. Description of the Prior Art

A prior art example of digital data apparatus of the above character is given in IBM Technical Disclosure Bulletin, Vol. 18, No. 3, August 1975, pages 878/9 in the article "Basic Storage Module Selection Check". In this article, a "command" signal is issued to a particular BSM (Basic Storage Module) by transmitting that "command" signal over a transfer bus to that BSM (and possibly other BSM's), and activating the particular BSM by a "command select" signal applied to that BSM only. The "command" signal includes a module address which is stored in an identified portion of each BSM to which the "command" signal is applied. The module address is also decoded by a system controller to produce the unique "command select" signal for the BSM. On receipt of the "command select" signal the BSM concerned compares the stored identifier portion with a pre-stored identification code. The "command" signal is executed or not according as the identifier portion matches or does not match the identification code. With such an implementation, it may be a first requirement to accommodate connection between the processing unit and different numbers of memory units, according to particular uses of the apparatus, and it may be a second requirement to allow connection of memory units in various different configurations. To achieve the first of these requirements it becomes necessary, in order to prevent any attempt by the processing unit to transfer data to a non-existent memory unit, for the processing unit to know which memory unit addresses are valid for selectively addressing memory units because respective memory units have been provided in respect of them, and which memory unit addresses are invalid because no memory units have been provided in respect of them. In a specific implementation of the digital data apparatus a unique multi-bit identification code is recorded in a storage location in each of a plurality of memory units, and this code is used by interrogation means for detecting the presence or absence of a memory unit corresponding to any memory unit address used by the processing unit to address the memory units. This detection can be effected by making the identification code for a memory unit code but one or more further units also. Such address codes are therefore considered to be invalid for the simpler configurations because they can select more than one memory or other peripheral unit, and can thus cause possible conflicts and hence corrupted data in the transfer to the processing unit.

It is a further object of the present invention to provide means of avoiding the use of this latter type of invalid address code for the second requirement mentioned above.

According to the present invention, there is provided digital data apparatus wherein said data processing unit has first means for applying to the address bus, in order to address a peripheral unit, a particular address code corresponding to at least part of said multi-bit identification code for each peripheral unit. Said data processing unit also has second means for generating select signals and applying them to the peripheral units via said address bus, each respective peripheral unit being directly selected by its respective select signal, which respective select signal is a bit of one value in said part of the identification code. Said data processing unit also has third means for enabling said transfer of digital data upon establishing the presence of said respective peripheral unit selected by said respective select signal. The first, the second and the third means are all part of the data processing unit, and thus a decoder is no longer needed in the peripheral unit for uniquely selecting that peripheral unit. Each peripheral unit is uniquely selected by the same as the address code for the unit and by causing interrogation means to compare these two codes. Also, in the specific implementation of the digital data apparatus, the memory unit addresses comprise multi-bit address codes which are fed over an address bus to a decoder which in respect of each code produces a unique select signal for selecting a particular one of the memory units for interrogation. The provision of the decoder ensures that each address code does select uniquely only one memory unit (when provided).

SUMMARY OF THE INVENTION

It is an object of the invention to allow connection of memory units in various different configurations (second requirement) and to involve in the apparatus the addressing of configurations of peripheral units for which it is uneconomic or undesirable to provide a decoder for producing a unique select signal in response to each possible address code which a processing or other main unit can supply on the address bus.

The present invention involves digital data apparatus having simpler configurations of peripheral units in which for uniquely selecting that peripheral unit there is no need for a decoder.

From a consideration of such simpler configurations it will be appreciated that although each memory or other peripheral unit can still be allocated a unique multi-bit address code as its identification code, there will be a large number of multi-bit address codes which, having therein more than once the bit value that has been chosen as a select signal, can as a consequence select not only the memory or other peripheral unit with the corresponding identification a select signal generated by the data processing unit and applied to said peripheral unit. The third means provides that no data could be transferred to a peripheral unit which is not connected to the data bus, and thus no data can be lost due to the absence of a peripheral unit.

In the U.S. Pat. No. 4,326,250, a decoder is dispensed with in a memory apparatus in which memory modules are distinguished from each other by high-order memory addresses while locations in each memory module are addressed by low-order memory addresses. Memory addresses, formed of high-order and low-order addresses, for addressing the memory locations, are communicated in parallel to all of the memory modules. Each of the memory modules includes a memory identifier means for storing a high-order identifier address. Each module includes comparator means for comparing the high-order address with the identifier address and if they match, an identifier signal is provided enabling the memory module to be addressed with the low-order address bits. All memory modules which do not have a match between the identifier address and the high-order memory address are not enabled.

In each of these two prior art apparatus, entire memory addresses, that is all the bits of the memory addresses, are communicated to (all) the memory modules for comparison therein with a pre-stored identification address. Each module has for this purpose its own comparator which "enables" the module when there is a match between the received and pre-stored addresses. The second prior art apparatus considered dispenses with a decoder, but at the expense of not providing a select signal by which a module is initially enabled selectively so that only that module performs the comparison process.

The present invention thus provides, in effect, a means of providing select signals from the address codes without the need for a decoding operation.

In digital data apparatus of the character set forth above, each peripheral unit can comprise two or more sub-units. In this event, in carrying the invention into effect, each sub-unit would have its own identification code recorded in a respective storage location therein, which identification codes for all the sub-units of a peripheral unit would have in said part the same one bit of said one value, so that this bit in the corresponding address codes constitutes a common select signal for the peripheral unit. This use of the identification codes has the advantage that the digital data apparatus can have peripheral units which contain different numbers of sub-units.

Other bits in said part which do not serve as select signal in address codes can be used singly or in combination to select the sub-units of each peripheral unit in accordance with their respective values. This use of the other bits in said part has the advantage that is provides a simple means of sub-unit identification within a peripheral unit when the peripheral units all have the same number of sub-units.

In a preferred embodiment of a digital data apparatus according to the invention, said data processing unit comprises a flag bit producer for inserting in each identification code at least one flag bit, the value of which is determined by the number of bits of said one value contained in said part of the identification code. The insertion of at least one flag bit to the identification code offers the possibility to extend the identification code and thus execute the selection of a peripheral unit more accurately without providing additional means to the peripheral unit and by using the same address bus.

In a further preferred embodiment of a digital data apparatus according to the invention, said third means comprises a comparator having a first input connected to said data bus for receiving identification codes and a second input connected to said first means and said flag bit producer and being provided for comparing the identification code of a selected peripheral unit with a word formed by said address code used to address said selected peripheral unit and at least one further flag bit produced by said flag bit producer upon said address code, said comparator also being provided for generating an enabling signal upon correspondence between said word and said identification code, said transfer being executed under control of said enabling signal. This comparison offers the advantage that it enables a verification of a valid address code for peripheral unit (or for a sub-unit thereof) to be made.

The identification codes can be recorded in the respective storage locations using a writing operation by which writing means in the data processing unit applies all the possible address codes to the address bus in turn in a special sequence, and for each address code the writing means also applies it, with or without flag bits, as data for recording into the storage location of each addressed peripheral unit or sub-unit, the special writing sequence being such that the address code which has all its bits of said one value is written first, followed by the address codes which have all their bits except one of said one value, followed by the address codes which have all their bits except two of said one value, and so on, the sequence finishing with the address code which has none of its bits of said one value.

This use of the special writing sequence has the advantage that there can be provided for each peripheral unit or sub-unit an identification code which uniquely identifies the unit irrespective of how many units are provided out of the total possible. This is because in the writing sequence the address codes which have the larger numbers of bits of said one value and which thus select the most peripheral units or sub-units occur before the address codes having the smaller numbers of bits of said one value, and the latter codes progressively over-write the former codes in the storage locations during the writing sequence, until there is finally written into the storage locations respective identification codes corresponding to address codes which can select only one peripheral unit or sub-unit.

BRIEF DESCRIPTION OF THE DRAWINGS

In further considering the nature of the invention reference will now be made by way of example to the accompanying drawings, of which.

DESCRIPTION OF THE PREFERRED EMBODIMENT

In the following description of the apparatus which is exemplified in the drawings, it will be assumed that memory is connected to the processing unit as a plurality of memory units each of the same number of storage bytes, this number corresponding to the smallest size of memory unit which is envisaged. Such a smallest size of memory unit will be deemed to be a "chapter" of memory for the purposes of the present description. These memory units can be respective memory devices each containing one "chapter" of memory, or a larger size memory device can be considered as a plurality of memory units each containing one "chapter" of memory. Each such larger size memory device would always contain an integral member of "chapters" of memory. Thus, a "chapter" can be 1024 bytes of 8 bits and, as will be described with reference to FIGS. 1 to 3, Random Access Memory (RAM) devices of 1, 2 and 4 chapter sizes could be available for use.

Figure 1:
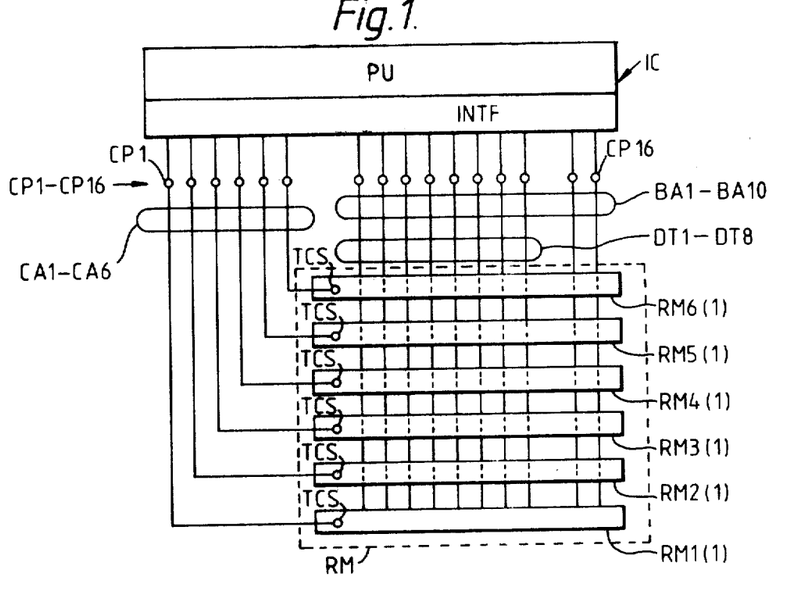
FIGS. 1 to 3 show diagrammatically respective examples of specific digital data apparatus of the character referred to having a digitally operable processing unit and associated random access memory (RAM) equipment.
Figure 2:
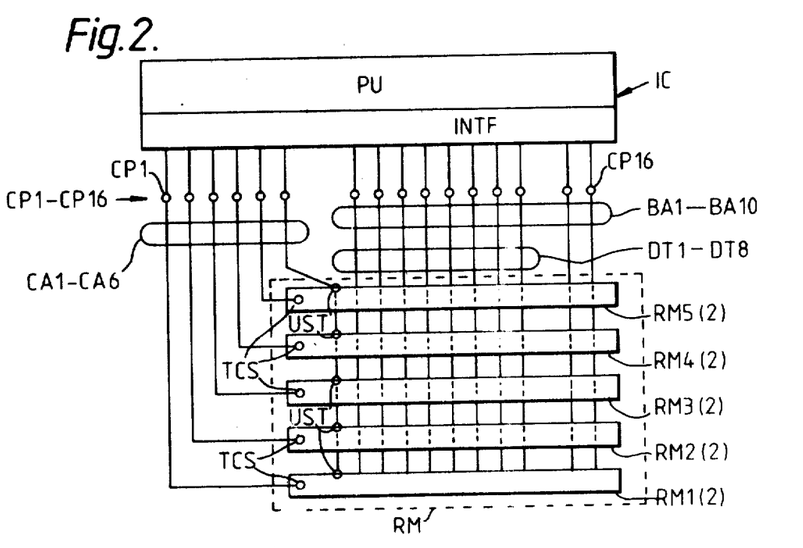
Figure 3:
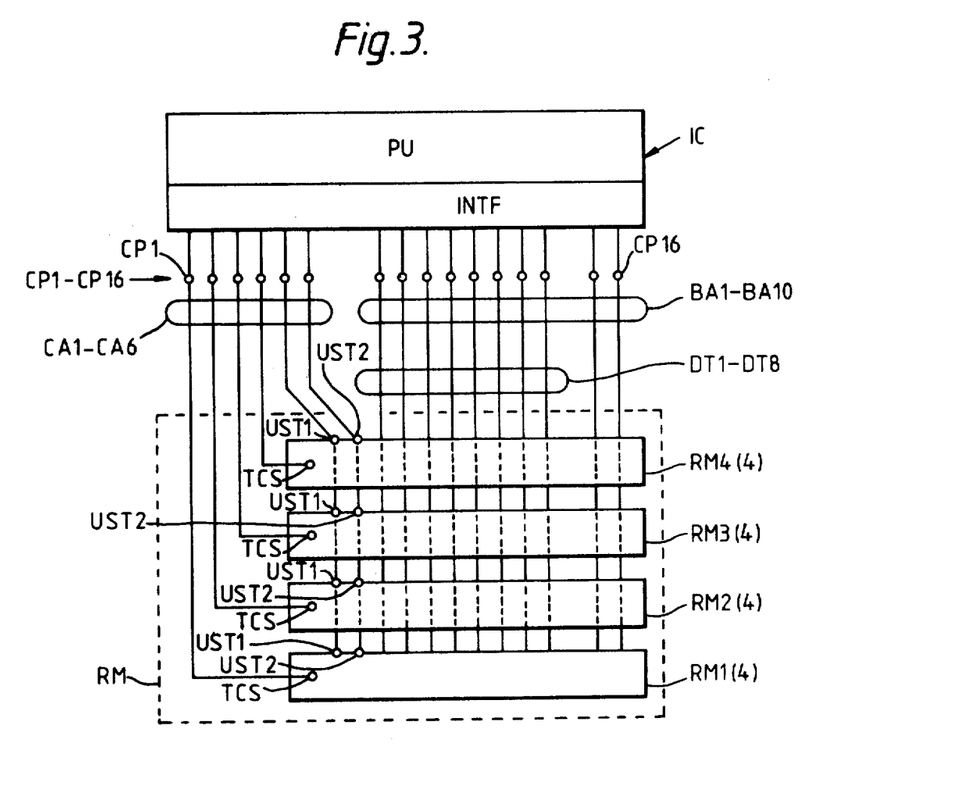

Referring now to the drawings, the digital apparatus shown in each of FIGS. 1 to 3 comprises an integrated circuit IC containing a processing unit PU and an interface circuit INTF which are interconnected internally in the integrated circuit IC. The integrated circuit IC has sixteen external connecting pins CP1 to CP16 by which external connection is made to RAM equipment RM which contains different numbers and configurations of memory units in the three Figures, as will be described. (The integrated circuit IC would, of course, have further external connecting pins (not shown) for applying thereto supply voltages, and for clock and control signals, etc.).

A 6-line address bus consisting of parallel address lines CA1 to CA6 extends between the RAM equipment RM and the connecting pins CP1 to CP6. Binary 6-bit chapter address codes applied from the processing unit PU over this address bus will select certain of the memory units in the RAM equipment RM. These 6-bit address codes constitute valid or invalid address codes, respectively, according as they can select only one, or more than one, memory unit.

A 10-line address bus connected to connecting pins CP7 to CP16 and consisting of parallel address lines BA1 to BA10, carries binary 10-bit byte address codes for identifying the 1024 8-bit bytes contained in each memory unit. This identification can be effected in known manner using a decoder (not shown) for converting the 10-bit address codes into suitable "byte" select signals. Of the address lines BA1 to BA10, the first eight (BA1 to BA8) also serve as data lines DT1 to DT8 which form an 8-line data bus for the transfer of data between the integrated circuit IC and the RAM equipment RM. The direction of data transfer is controlled from the processing unit PU. The address/data bus (BA1 to BA10, DT1 to DT8) is used on a multiplex basis in different time intervals for either byte addressing or data transfer, this multiplexing also being controlled from the processing unit PU. As an alternative, a separate 8-line data bus can be provided, but this requires an additional eight connecting pins on the integrated circuit IC.

In FIG. 1, the RAM equipment RM comprises six discrete RAM devices RM1(1) to RM6(1) each of which has a capacity of one memory unit. Each of the devices RM1(1) to RM6(1) has a so-called "chip" select terminal TCS, and the address lines CA1 to CA6 are connected respectively to these terminals. When one of these address lines is made active (e.g. active high to signify binary level "1") by the processing unit PU to constitute a "chip" select signal, the particular RAM device to which that address line is connected is selected for data transfer. Byte addressing and data transfer can thereafter be effected over the address/data lines BA1 to BA10/DT1 to DT8.

Details of circuits which are used for "chip" selecting, byte addressing and data transfer are readily available and will not, therefore, be described in the present specification in respect of the apparatus shown in FIGS. 1 to 3; particularly also as a description of such circuit details is not necessary for an understanding of the present invention.

The RAM equipment RM of the apparatus shown in FIG. 2 comprises five discrete RAM devices RM1(2) to RM5(2) each of which has a capacity of two memory units. In this apparatus, the address lines CA1 to CA5 are connected to the "chip" select terminal of the respective RAM devices, while the address line CA6 is connected to a 1-out-of-2 "unit" select terminal UST of each device and is used to determine which of the two memory units of a selected RAM device is to be chosen, according as this latter address line CA6 is made active high (binary level "1") or active low (binary level "0").

The RAM equipment RM of the apparatus shown in FIG. 3 comprises four discrete RAM devices RM1(4) to RM4(4) each of which has a capacity of four memory units. The address lines CA1 to CA4 are connected to the "chip" select terminal TCS of the respective RAM devices, while the address lines CA5 and CA6 are connected respectively to 1-out-of-4 "unit" select terminals UST1 and UST2 of each device and are used to determine, in accordance with their unique binary level combinations (00, 01, 10 and 11), which one of the four memory units of a selected RAM device is to be chosen.

For the memory unit choice in FIG. 2, simple gating logic would be provided in the RAM devices to distinguish between the "1" and "0" binary levels of the address line CA6, while for the memory unit choice in FIG. 3, a simple decoder would be provided in the RAM devices to select the four different "1" and "0" binary level combinations of the address lines CA5 and CA6.

It will be appreciated from the foregoing examples of specific digital data apparatus of the character referred to, as shown in FIGS. 1 to 3, that for a given number n of address lines which are provided for chapter address codes, (n−m) of these n address lines can be used directly for addressing discrete RAM devices each containing $2^m$ chapter size memory units, where m equals 0, 1, 2 ... (n−1), with simple decoding for determining the $2^m$ different combinations when m>0.

Figure 4:
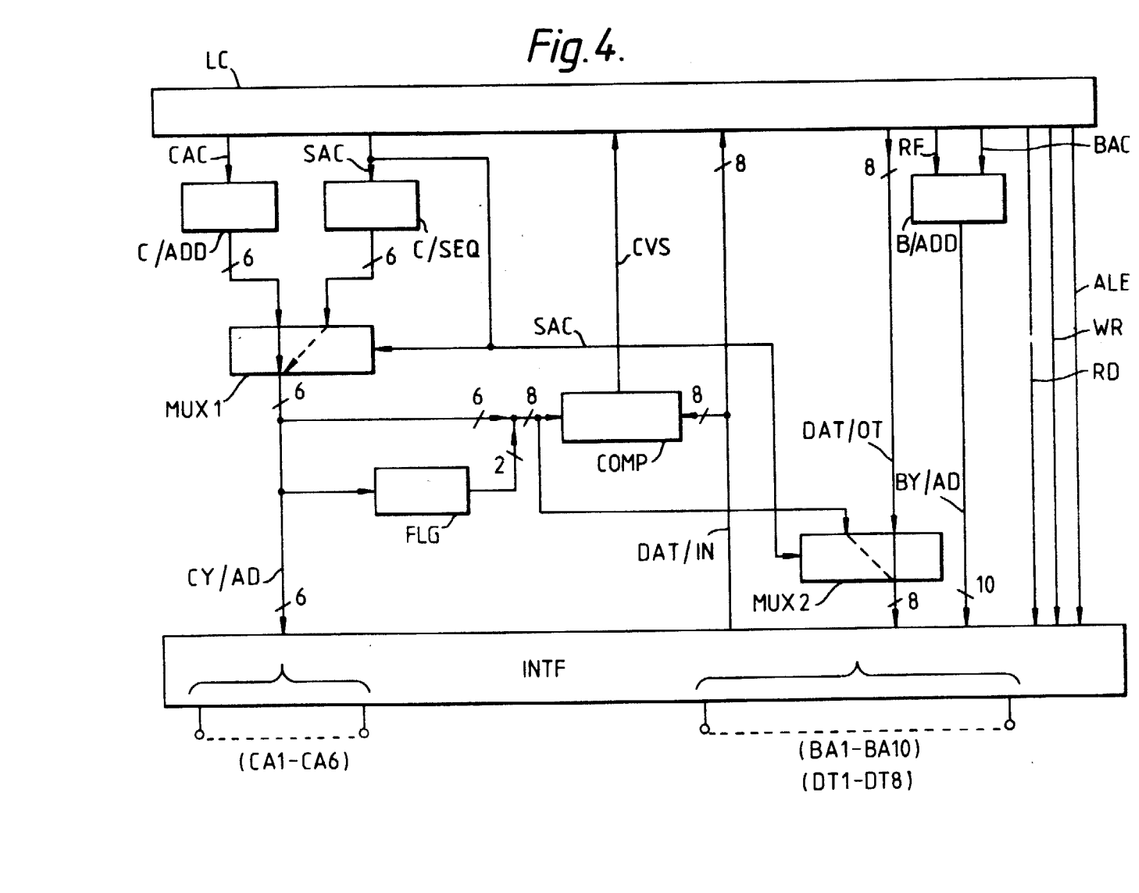
FIG. 4 shows diagrammatically certain logic elements in the processing unit of the apparatus in FIGS. 1 to 3.

As shown in FIG. 4, the processing unit PU includes a chaper addresser C/ADD for producing the 6-bit chapter address codes for application via a 6-bit connection CY/AD to the address bus CA1 to CA6 by way of a multiplexer MUX1 in its unswitched state. A logic circuit LC of the processing unit controls the operation of the chapter addresser C/ADD over a control lead or leads CAC. A possible means of implementation and control would be for the logic circuit LC to supply stepping pulses to a counter, which forms the chapter addresser, until a count corresponding to a required address code is reached, following which this address code would be held latched for application to the address bus. Additionally, these 6-bit address codes are produced periodically in a special sequence by a chapter address sequencer C/SEQ in response to a control signal from the logic circuit LC on a control lead SAC. In this instance also a convenient means of implementation and control would be for the logic circuit LC to supply stepping pulses to a counter which forms the chapter address sequencer, but with the counter having its counting stages interconnected with appropriate gating and feed-back paths to produce a count according to the special sequence instead of its natural count. The sequenced address codes are applied to the address bus CA1 to CA6 by way of the multiplexer MUX1 in its switched state, the switching of this multiplexer being effected by the control signal on the control lead SAC.

The sequenced address codes, along with flag bits as will be described, are also applied by way of another multiplexer MUX2, in its switched state, to the data bus DT1 to DT8 to be recorded with the flag bits as identification codes in a specially allocated storage location (byte) in each of those memory units which are provided. The specially allocated storage location is the same byte in each memory unit and is identified, both for writing into and for reading from, by the appropriate byte address code as produced by a byte addresser B/ADD, which produces the 10-bit byte address codes on a 10-bit connection BY/AD for application to the address bus BA1 to BA10, in response to a RAM finder signal from the logic circuit LC on a control lead RF. The logic circuit LC otherwise controls the byte addresser B/ADD for byte addressing during normal memory unit operation over a control lead BAC. Also, for normal memory unit operation, data written into a memory unit storage byte is fed from the logic circuit LC by way of the multiplexer MUX2, in its unswitched state, over an 8-bit connection DAT/OT to the data bus DT1 to DT8: data read from a memory unit storage byte is fed to the logic circuit LC from the data bus DT1 to DT8 over an 8-bit connection DAT/IN. The leads RD, WR and ALE signify the "read", "write" and "address latch enable" control which is exercised in conventional known manner by the logic circuit LC on the memory units.

The processing unit PU also includes a comparator COMP and a flag bit producer FLG. The chapter address codes at the output of the multiplexer MUX1 are applied to both the comparator COMP and to the flag bit producer FLG, which latter is responsive to an applied chapter address code to produce two flag bits the binary value combination of which is representative of how many bits of the value which constitutes a "chip" select signal are contained in the address code. These two flag bits are applied to the comparator COMP along with the 6-bit chapter address code. The 6-bit chapter address codes, along with their respective two flag bits, also form the 8-bit identification codes which are applied over the data bus DT1 to DT8 for recording in the specially allocated storage location in the memory units. A chapter address code applied to the address bus CA1 to CA6 is tested for validity by the comparator COMP by comparing this address code with the corresponding 6-bit portion of the identification code which is read from the specially allocated storage location of the memory unit which is (notionally) being addressed by the chapter address code being tested. If this comparison shows agreement then the test for validity as set forth in my said co-pending U.S. patent application is satisfied.

In accordance with the present invention the comparison which is effected by the comparator COMP also extends to the flag bits to test the validity of a chapter address code in respect of its ability to select one and only one memory unit. If this second test for validity, which will be considered in detail next, is satisfied then the comparator COMP produces a chapter valid signal on a lead CVS, and the logic circuit knows that for the chapter address code concerned, a memory unit has been provided in which data can be stored.

When a special writing sequence is to be carried out to record identification codes in the specially allocated storage locations of those memory units which are provided, the logic circuit LC applies a control signal to the control lead RF to cause the byte addresser B/ADD to produce the address of the specially allocated storage location, and it applies a control signal to the control lead SAC to switch the multiplexers MUX1 and MUX2 and to start the chapter address sequencer C/SEQ. This special writing sequence, which would be initiated when power to the apparatus is switched on, and/or at relatively infrequent intervals when the apparatus is in use, goes in Table I below, and each address code as it is produced to select a memory unit is written into the specially allocated storage location of the memory unit, together with certain flag bits. (The Table I assumes binary '1' as active chip select).

TABLE I

| Chapter address code applied to address bus CA1 to CA6 | Corresponding identification codes applied to data bus DT1 to DT8 | |
|---|---|---|
| | (Code) | (Flag bits) |
| 111111 | 111111 | 00 |
| 111110 etc. (one 0) | 111110 etc. | 00 |
| 111100 etc. (two 0's) | 111100 etc. | 00 |
| 111000 etc. (three 0's) | 111000 etc. | 01 |
| 110000 etc. (four 0's) | 110000 etc. | 10 |
| 100000 etc. (five 0's) | 100000 etc. | 11 |
| 000000 | 000000 | etc. 00 |

"etc." in the above Table I implies all the code combinations with the pattern concerned. For example, 111110 etc. implies all the code combinations having only one "0", i.e., 111110, 111101, 111011, 110111, 101111, 011111. It does not matter in the writing sequence in what order the code combinations in any particular pattern occur, but the patterns themselves have to occur in the order specified in Table I. The reason for this is that for the correct operation of the apparatus it is necessary for each memory unit to be validly selected by one, and only one, chapter address code. In other words, of the possible chapter address codes which are available, only those which can select one, and only one, memory unit can be used. For instance, for the configuration of apparatus shown in FIG. 1, the chapter address code 000011 would select both the single memory unit RAM devices RM5(1) and RM6(1), while the chapter address code 111111 would select all six RAM devices RM1(1) to RM6(1). Clearly, therefore, such codes which can select more than one memory unit cannot be used in the identification codes which are recorded in the specially allocated storage locations of the memory units. Thus, for the configuration of apparatus shown in FIG. 1, the RAM device RM6(1) is required to have the chapter address code 000001 in its identification code because only this code uniquely selects the RAM device RM6(1). With the writing sequence set forth in Table I, the RAM device RM6(1) would have chapter address codes written into its specially allocated storage location in a sequence such as set forth below in Table II, each code over-writing the previous code, so that 000001 remains as the code which is finally recorded as part of the identification code.

TABLE II

| | |
|---|---|
| 111111 | (six 1's) |
| 111101, 111011, 110111, 101111, 011111 | (five 1's) |
| 111001, 110101, 101101, 011101, 110011, 101011, 011011, 100111, 010111, 001111 | (four 1's) |
| 110001, 100011, 000111, 100101, 001011, 101001, 010011, 001101, 011001, 010101 | (three 1's) |
| 100001, 010001, 001001, 000101, 000011 | (two 1's) |

TABLE II-continued

| | |
|---|---|
| 000001 | (one 1) |

This sequence in Table II, which occurs as a result of the special writing sequence according to Table I, comprises all the chapter address codes which have the value "1" in the (least significant) bit position which pertains to the RAM device RM6(1). Similarly, the RAM device RM5(1) would have chapter address codes written into its special storage location in a sequence such as set forth in Table III below, each code again over-writing the previous code, so that 000010 remains as the address code which is finally recorded as part of the identification code.

TABLE III

| | |
|---|---|
| 111111 | (six 1's) |
| 111110, 111011, 110111, 101111, 011111 | (five 1's) |
| 111010, 110110, 101110, 011110, 110011, 101011, 011011, 100111, 010111, 001111 | (four 1's) |
| 110010, 100011, 000111, 100110, 001011, 101010, 010011, 001110, 011010, 010110 | (three 1's) |
| 100010, 010010, 001010, 000110, 000011 | (two 1's) |
| 000010 | (one 1) |

The other RAM devices RM4(1), RM3(1), RM2(1) and RM1(1) are treated similarly so that address codes 000100, 001000, 010000 and 100000 are recorded in their respective specially allocated storage locations as part of their identification codes.

As regards the apparatus in FIG. 2, it will be evident from the foregoing that chapter address codes 000010 and 000011 with both "chip select" the RAM device RM5(2), with these two codes respectively pertaining to the two memory units of this device and therefore being recorded in the specially allocated storage location of the appertaining memory unit as part of its identification code. Similarly, the pairs of chapter address codes 000100, 000101; 001000, 001001; 010000, 010001; and 100000, 100001 pertain respectively to the two memory units in the other four RAM devices RM4(2) to RM1(2).

As regards the apparatus in FIG. 3, it will further be evident that each of the four chapter address codes 000100, 000101, 000110, and 000111 will "chip select" the RAM device RM4(4), with these four codes respectively pertaining to the four memory units of this device and therefore being recorded in the specially allocated storage location of the appertaining memory unit as part of its identification code. Similarly, the sets of four chapter address codes 001000, 001001, 001010, 001011; 010000, 010001, 010010, 010011; and 100000, 100001, 100010, 100011 pertain respectively to the four memory units in the other three RAM devices RM3(4), RM2(4) and RM1(4).

The configurations of digital data apparatus shown in FIGS. 1 to 3 are just examples of the many configurations which are possible, and within each configuration the total possible number of memory units need not be provided. Within these confines, the special writing sequence as set forth above in Table I ensures that the chapter address code recorded as part of the identification code in each memory unit which is provided is unique to that memory unit. Also, within the above confines, the processing unit of the digital data apparatus has to be able to select a memory unit for use simply by applying chapter address codes to the address bus in, say, a natural binary counting sequence, until a single memory unit is selected for use. As mentioned previously, the flag bits which are included in the identification codes recorded in the specially allocated storage locations of the memory units provide a means for invalidating those chapter address codes which select more than one memory unit. These flag bits, of which in the present embodiment there are two in each identification code, signify the number of binary bits of "1" value contained in the code. All the chapter address codes having the same number of "1"s (and thus "0"s) have the same two flag bits allocated to them, both as part of the identification codes for the memory units, and for the comparison operation performed by the comparator COMP in FIG. 4 between the chapter address code which is addressing the memory units and the identification code(s) resulting from this addressing. Suitable flag bit combinations are 11, 10 and 01 for one, two and three 1's respectively, in an address code, and the flag bit combination 00 is used for none, four, five and six 1's in an address code.

Consider now some examples, in the configuration of apparatus shown in FIG. 1, the chapter address code 000000 will select none of the RAM devices RM1(1) to RM6(1) so that the comparator COMP (FIG. 4), which receives 000000 00 as the code plus flag bits, receives no resulting identification code and therefore does not produce the chapter valid signal on lead CVS. When a chapter address code having a single "1" in it (e.g. 000001 plus flag bits 11) is produced by the processing unit, only one RAM device (i.e. RM6(1) for code 000001 if actually provided) is selected and thus outputs the identification code with the matching address code and flag bits. The comparator COMP agrees the comparison to produce the chapter valid signal on the lead CVS. With a chapter address code containing two 1's (and four 0's), e.g. 000011 plus flag bits 10, two RAM devices (i.e. RM6(1) and RM5(1)) are selected simultaneously. This produces conflicts on the six data lines of the data bus DT1 to DT8 which carry the address code part of the identification codes, this data conflict preventing the comparator COMP from effecting a proper comparison of this part with the applied address code. However, both of the RAM devices output the same two flag bits (11), and so those two bits are not in conflict on the other two data lines of the data bus. These two flag bits (11) do not match the two flag bits (10) which are allocated to the address code 000011 and the comparator COMP therefore rejects this address code as invalid.

With a chapter address code containing three 1's and three 0's, the relevant three of the RAM devices RM1(1) to RM6(1) are selected, again resulting in data conflict on three of the six lines of the data bus which carry the address code part of the identification codes. However, once again the flag bits (01) do not match the common flag bits (11) in the three identification codes concerned, so that once again the comparator COMP rejects this address code as invalid. It will be apparent that address codes containing four, five and six 1's are similarly rejected as being invalid.

In the specific examples of digital data apparatus shown in FIGS. 1 to 3, the memory units are assumed to be organized in 8-bit bytes, as discussed above. Therefore, using the 6-bit address codes as part of the identification codes leaves only two bits for the flag bits, so that only four types of chapter address codes can be distinguished, i.e. those containing one 1, two 1's, three 1's, and others, as required by these specific examples.

The logic operation of these three specific examples is given in the following Tables IV, V and VI, respectively.

TABLE IV

FIG. 1 - apparatus with 6 RAM devices each containing 1 memory unit.

| Comparison Address | Flag | No. of memory units selected | Flag from memory unit(s) | Valid |
|---|---|---|---|---|
| 000000 | 00 | 0 | — | NO |
| 000001 etc. | 11 | 1 | 11 | YES |
| 000011 etc. | 10 | 2 | 11 | NO |
| 000111 etc. | 01 | 3 | 11 | NO |
| 001111 etc. | 00 | 4 | 11 | NO |
| 011111 etc. | 00 | 5 | 11 | NO |
| 111111 etc. | 00 | 6 | 11 | NO |

TABLE V

FIG. 2 - apparatus with 5 RAM devices each containing 2 memory units.

| Comparison Address | Flag | No. of memory units selected | Flag from memory unit(s) | Valid |
|---|---|---|---|---|
| 000000 | 00 | 0 | — | NO |
| 000001 | 11 | 0 | — | NO |
| 000010 etc. | 11 | 1 | 11 | YES |
| 000011 etc. | 10 | 1 | 10 | YES |
| 000110 etc. | 10 | 2 | 11 | NO |
| 000111 etc. | 01 | 2 | 10 | NO |
| 001110 etc. | 01 | 3 | 11 | NO |
| 001111 etc. | 00 | 3 | 10 | NO |
| 011110 etc. | 00 | 4 | 11 | NO |
| 011110 etc. | 00 | 4 | 10 | NO |
| 111110 etc. | 00 | 5 | 11 | NO |
| 111111 etc. | 00 | 5 | 10 | NO |

TABLE VI

FIG. 3 - apparatus with 4 RAM devices each containing 4 memory units.

| Comparison Address | Flag | No. of memory units selected | Flag from memory unit(s) | Valid |
|---|---|---|---|---|
| 000000 | 00 | 0 | — | NO |
| 000001 | 11 | 0 | — | NO |
| 000010 |  |  |  |  |
| 000011 | 10 | 0 | — | NO |
| 000100 etc. | 11 | 1 | 11 | YES |
| 000101 | 10 | 1 | 10 | YES |
| 000110 etc. |  |  |  |  |
| 000111 etc. | 01 | 1 | 01 | YES |
| 001100 etc. | 10 | 2 | 11 | NO |
| 001101 | 01 | 2 | 10 | NO |
| etc. |  |  |  |  |
| 001110 etc. |  |  |  |  |
| 001111 etc. | 00 | 2 | 01 | NO |
| 011100 etc. | 01 | 3 | 11 | NO |
| 011101 | 00 | 3 | 10 | NO |
| 011110 etc. |  |  |  |  |
| 011111 etc. | 00 | 3 | 01 | NO |
| 111100 | 00 | 4 | 11 | NO |
| 111101 | 00 | 4 | 10 | NO |
| 111110 |  |  |  |  |
| 111111 | 00 | 4 | 01 | NO |

It can be seen from Table IV that, as given in the earlier examples, valid chapter address codes contain only a single 1 for the apparatus of FIG. 1. From Table V it can be seen that valid chapter address codes contain one or two 1's for the apparatus of FIG. 2, and from Table VI that they contain one, two or three 1's for the apparatus of FIG. 3. For the apparatus of FIG. 1, only valid chapter address codes contain a single 1. For the apparatus of FIG. 2, both valid and invalid chapter address codes can contain one or two 1's, but such invalid chapter address codes are identified as being invalid because their associated flag bits are different from the flag bits in the identification codes of the memory units which they address. For example, the invalid address code 000110 (with flag bits 10) is equivalent to the two address codes 000100 and 000010 (each with flag bits 11) which are in the identification codes that are produced by this invalid address code for comparison. The address code part of those identification codes is therefore different and thus causes data bus conflicts, as aforesaid. The flag bits (11) are the same for each code and are different from the flag bits (10) associated with the applied chapter address code. Therefore, this address code is detected as being invalid, as required.

For the apparatus of FIG. 3, both vaid and invalid chapter address codes can contain one, two or three 1's, but again the difference in the flag bits distinguishes between the valid and invalid address codes. For example, the invalid address code 001110 (with flag bits 01) is equivalent to the two address codes 001010 and 000110 (each with flag bits 10) which are in the identification codes that are produced by this invalid address code for comparison. The address code part of these identification codes is therefore different and thus causes data bus conflicts. The flag bits (10) are the same for each code and are different from the flag bits (01) associated with the applied chapter address code. Therefore, this address code is rejected as being invalid.

In the Tables IV, V and VI, "etc." implies (as it does in Table I) the other code combinations with the pattern concerned. For instance, in Table VI, "000101/000110 etc." implies the code combinations "001001/001010", "010001/010010", and "100001/100010", all of which code combinations pertain respectively to two of the valid chapter address codes for the RAM devices RM4(4) to RM1(4).

The principle of the invention can be extended to other configurations of digital data apparatus, for instance to three "chip selected" RAM devices each comprising eight chapter size memory units. Such a configuration could be catered for by allocating another special storage location in each memory unit for identication purposes to increase the number of flag bits that can be included in the identification codes. Also, the use of chapter address codes with a different number of bits is possible. For example, five bit chapter address codes can define 1 to 32 memory units, leaving 3 bits in an 8-bit byte for flag bits which are sufficient to define all 6 different code combinations for the address codes; that is, code combinations having 0, 1, 2, 3, 4 and 5 ones. An apparatus configuration comprising two RAM devices each containing eight memory units will be catered for in this way by using two of the address lines to "chip select" the RAM devices and the other three address lines to define the eight memory units of a RAM device.

I claim:

1. Digital data apparatus comprising a data processing unit and a plurality of peripheral units, said data processing unit and said peripheral units being connected to a data bus for the transfer of digital data, said data processing unit being also connected to an address bus which comprises at least as many address lines as there are peripheral units, each peripheral unit being directly connected to said data processing unit by means of at least one of said address lines for selectively addressing said peripheral unit, each peripheral unit having a dedicated storage location for storing a multi-bit identification code which identifies uniquely that peripheral unit, wherein said data processing unit further comprises:

first means for applying to the address bus a particular address code corresponding to at least part of said multi-bit identification code for each peripheral unit to address said peripheral unit;

second means for generating select signals and applying them to the peripheral units via said address bus, each peripheral unit being directly selected by its select signal, which select signal is a bit of one value in said part of said multi-bit identification code; and     third means for enabling said transfer of digital data upon establishing the presence of said peripheral unit selected by said select signal.

2. Digital data apparatus as claimed in claim 1, wherein said data processing unit comprises a flag bit producer for inserting in each multi-bit identification code at least one flag bit, the value of which is determined by the number of bits of said one value contained in said part of the multi-bit identification code.

3. Digital data apparatus as claimed in claim 2, wherein said third means comprises a comparator having a first input connected to said data bus for receiving identification codes and a second input connected to said first means and said flag bit producer and being provided for comparing the multi-bit identification code of a selected peripheral unit with a word formed by said address code used to address said selected peripheral unit and at least one further flag bit produced by said flag bit producer upon said address code, said comparator also being provided for generating an enabling signal upon correspondence between said word and said multi-bit identification code, said transfer being executed under control of said enabling signal.

4. Digital data apparatus as claimed in any one of the claims 1 to 3, wherein said multi-bit identification codes in the dedicated storage locations are inscribed by using a writing operation in which said writing means in the data processing unit applies all the possible address codes to the address bus in turn in a special sequence, and said writing means also applies each address code with flag bits, as data for recording into the storage location of each addressed peripheral unit or sub-unit, the special writing sequence being such that the address code which has all bits of said one value is written first, followed by the address codes which have all their bits except one of said one value, followed by the address codes which have all their bits except two of said one value, and so on, the sequence finishing with the address code which has none of its bits of said one value.

5. Digital data apparatus as claimed in any of the claims 1 to 3, wherein said multi-bit identification codes in the dedicated storage locations are inscribed by a writing operation in which said writing means in the data processing unit applies all the possible address codes to the address bus in turn in a special sequence, and that for each address code the writing means also applies it, without flag bits, as data for recording into the storage location of each addressed peripheral unit or sub-unit, the special writing sequence being such that the address code which has all its bits of said one value is written first, followed by the address codes which have all their bits except one of said one value, followed by the address codes which have all their bits except two of said one value, and so on, the sequence finishing with the address code which has none of its bits of said one value.

* * * * *